(12) United States Patent
Aikawa et al.

(10) Patent No.: US 11,236,800 B2
(45) Date of Patent: Feb. 1, 2022

(54) DAMPER DEVICE

(71) Applicant: EXEDY Corporation, Neyagawa (JP)

(72) Inventors: Masataka Aikawa, Neyagawa (JP); Hiroki Matsuo, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 427 days.

(21) Appl. No.: 16/281,970

(22) Filed: Feb. 21, 2019

(65) Prior Publication Data
US 2019/0285135 A1    Sep. 19, 2019

(30) Foreign Application Priority Data

Mar. 19, 2018 (JP) .............................. JP2018-050684
Jan. 18, 2019 (JP) .............................. JP2019-006519

(51) Int. Cl.
*F16F 15/134*    (2006.01)
*F16F 15/16*    (2006.01)
(Continued)

(52) U.S. Cl.
CPC .... *F16F 15/13492* (2013.01); *F16F 15/1234* (2013.01); *F16F 15/12326* (2013.01);
(Continued)

(58) Field of Classification Search
CPC .... F16F 15/13492; F16F 15/16; F16F 15/315; F16F 2222/08; F16F 2232/02;
(Continued)

(56) References Cited

U.S. PATENT DOCUMENTS 7,364,511 B2 *  4/2008  Jee .................... F16F 15/13453
                                                              464/68.4
7,484,434 B2 *  2/2009  Jung ................. F16F 15/13438
                                                               74/574.4
(Continued)

FOREIGN PATENT DOCUMENTS

DE       19958813 A1   12/2000
EP        1460304 A1    9/2004
(Continued)

OTHER PUBLICATIONS

Extended European Search Report of the corresponding European Patent Application No. 19162480.8, dated Jul. 11, 2019, 6 pp.

*Primary Examiner* — Thomas C Diaz
(74) *Attorney, Agent, or Firm* — United IP Counselors, LLC

(57) ABSTRACT

A damper device is disclosed. The damper device includes first and second rotary members, a plurality of elastic members, and a plurality of end seat members. The first rotary member includes a first engaging portion and an annular chamber filled with a viscous fluid in an interior thereof. The second rotary member includes a second engaging portion, and is rotatable relative to the first rotary member. The plurality of elastic members are aligned in a circumferential direction in the interior of the annular chamber, and elastically couple the first rotary member and the second rotary member in a rotational direction. Each of the plurality of end seat members is disposed between one of the plurality of elastic members and at least one of the first and second engaging portions. The each of the plurality of end seat members includes an end seat communicating groove penetrating therethrough in the circumferential direction.

5 Claims, 5 Drawing Sheets

(51) Int. Cl.
*F16F 15/315* (2006.01)
*F16F 15/123* (2006.01)
(52) U.S. Cl.
CPC ............ F16F 15/16 (2013.01); F16F 15/315 (2013.01); *F16F 2222/08* (2013.01); *F16F 2230/04* (2013.01); *F16F 2232/02* (2013.01)
(58) Field of Classification Search
CPC ............ F16F 15/12326; F16F 15/1234; F16F 15/13438; F16F 15/13453
See application file for complete search history.

(56) References Cited

U.S. PATENT DOCUMENTS

| | | | |
|---|---|---|---|
| 2005/0126332 A1 | | 6/2005 | Jung et al. |
| 2006/0032717 A1* | | 2/2006 | Jee .................... F16F 15/13438 188/379 |

FOREIGN PATENT DOCUMENTS

| | | | | |
|---|---|---|---|---|
| EP | 1626198 A2 | | 2/2006 | |
| JP | 2015-086965 A | | 5/2015 | |
| KR | 20110037398 A | * | 4/2011 | ............ F16F 15/315 |

* cited by examiner

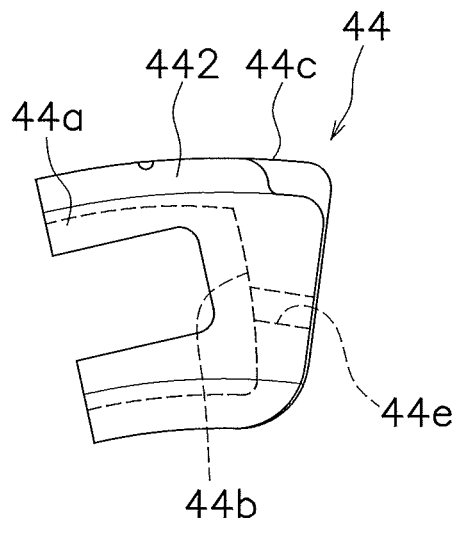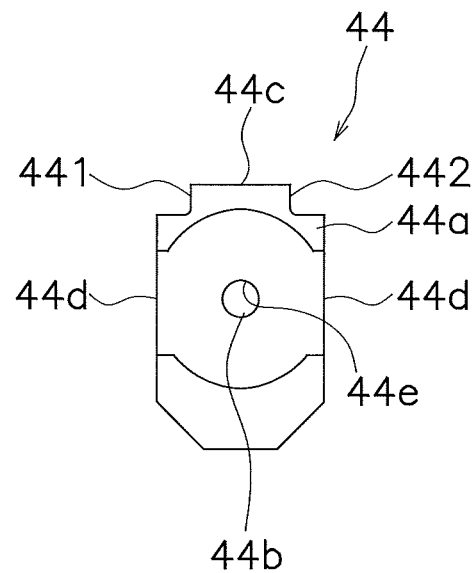
FIG. 4A  FIG. 4B
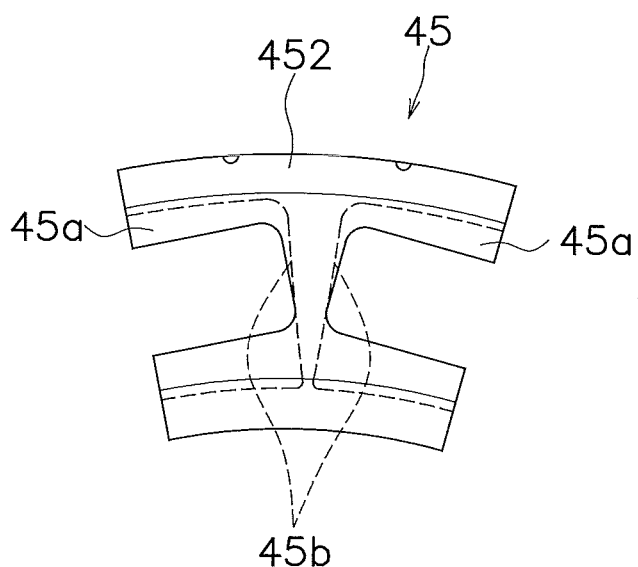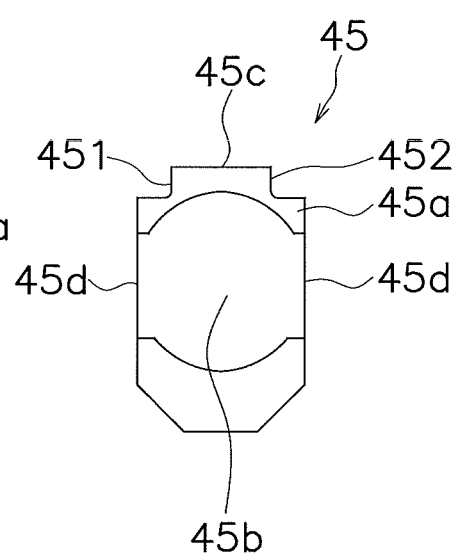
FIG. 5A  FIG. 5B

DAMPER DEVICE

CROSS-REFERENCE TO RELATED APPLICATIONS

This application claims priority to Japanese Patent Application No. 2018-050684, filed Mar. 19, 2018 and Japanese Patent Application No. 2019-006519, filed Jan. 18, 2019. The contents of those applications are incorporated by reference herein in their entirety.

TECHNICAL FIELD

The present disclosure relates to a damper device.

BACKGROUND ART

A damper device is embedded in a drivetrain for a vehicle in order to transmit power transmitted thereto from an engine and attenuate fluctuations in rotation inputted thereto. There has been proposed, as this type of damper device, such a flywheel assembly as described in Japan Laid-open Patent Application Publication No. 2015-86965.

The flywheel assembly described in Japan Laid-open Patent Application Publication No. 2015-86965 includes an input-side rotary member to which the power of the engine is inputted and an output plate disposed to be rotatable with respect to the input-side rotary member. The input-side rotary member and the output plate are elastically coupled in a rotational direction by a plurality of springs. Additionally, spring seats are disposed between the respective flywheels and the springs and also between the springs.

In the flywheel assembly, an annular chamber is formed by the input-side rotary member. A viscous fluid such as grease is filled in the annular chamber. Additionally, rotational vibration is attenuated by resistance of the viscous fluid in relative rotation between the input-side rotary member and the output plate.

In the flywheel assembly described in Japan Laid-open Patent Application Publication No. 2015-86965, when the input-side rotary member and the output plate are rotated relative to each other, the grease flows into a space between the input-side rotary member and the output plate, specifically, a space between the input-side rotary member and spring-engaged portions of the output plate. Once flowing into the space, the grease has difficulty in flowing out of the space due to the spring seats functioning as partitions. Because of this, viscous resistance exceeding a planned magnitude of resistance occurs in a damper actuation range, whereby desired attenuation performance cannot be obtained.

BRIEF SUMMARY

It is an object of the present disclosure to inhibit occurrence of viscous resistance greater than or equal to a planned magnitude of resistance and enhance damper attenuation performance in a damper device attenuating rotational vibration by a viscous fluid.

(1) A damper device according to the present disclosure includes a first rotary member, a second rotary member, a plurality of elastic members and a plurality of end seat members. The first rotary member includes a first engaging portion and an annular chamber filled with a viscous fluid in an interior thereof. The second rotary member includes a second engaging portion and is rotatable relative to the first rotary member. The plurality of elastic members are disposed in alignment in a circumferential direction in the interior of the annular chamber, and elastically couple the first rotary member and the second rotary member in a rotational direction. Each of the plurality of end seat members is disposed between one of the plurality of elastic members and at least one of the first engaging portion and the second engaging portion, and includes a communicating groove penetrating therethrough in the circumferential direction.

In the present device, for instance, power inputted to the first rotary member is transmitted to the second rotary member through the elastic members. When the elastic members are compressed through the end seat members in transmission of the power, torsion (relative rotation) of the second rotary member occurs with respect to the first rotary member. In the actuation described above, the viscous fluid residing between the end seat members moves to a gap between the first rotary member and the second rotary member, specifically, a gap between one rotary member and the engaging portion of the other rotary member. The viscous fluid accumulated in the gap flows out through the communicating groove provided on each end seat member.

Here, in damper actuation, viscous resistance occurring due to the viscous fluid can be prevented from increasing in magnitude and exceeding a preliminarily set magnitude of resistance. Therefore, degradation in damper attenuation performance can be inhibited.

(2) Preferably, the communicating groove is provided on at least one of two corners at which an outer peripheral surface and lateral surfaces intersect in the each of the plurality of end seat members.

The communicating groove is herein provided on at least one of the corners on the outer periphery of each end seat member. Hence, each elastic member received by each end seat member can be designed to have a large outer diameter. Additionally, one of the engaging portions of the first and second rotary members is engaged with an axially middle part of each end seat member. Therefore, the structure of the communicating groove provided on at least one of the corners on the outer periphery of each seat member can prevent the engaging portion from closing the communicating groove.

(3) Preferably, the damper device further includes at least one intermediate seat member. The at least one intermediate seat member is disposed between the plurality of elastic members, and the at least one intermediate seat member includes a communicating groove penetrating therethrough in the circumferential direction.

In this case, the viscous fluid smoothly flows through the communicating groove from one side to the other side of the at least one intermediate seat member in the circumferential direction. Because of this, similarly to the above, viscous resistance occurring due to the viscous fluid can be inhibited from increasing in magnitude, and degradation in damper attenuation performance can be inhibited.

(4) Preferably, the communicating groove of the each of the plurality of end seat members and the communicating groove of the at least one intermediate seat member are disposed on a circumference of a common circle.

The communicating grooves of the both seat members are herein disposed on the circumference of the common circle. Hence, the viscous fluid becomes likely to be evenly distributed in a circumferential shape.

(5) Preferably, the first rotary member includes a pair of disc-shaped members disposed in opposition to each other in an axial direction. Additionally, the second rotary member is disposed between the pair of disc-shaped members in the axial direction.

(6) Preferably, the each of the plurality of end seat members includes a hole penetrating through a bottom portion of the each of the plurality of end seat members in the circumferential direction, and an end surface of the one of the plurality of elastic members contacts the bottom portion.

The viscous fluid, accumulated in a gap between one rotary member and the engaging portion of the other rotary member, is herein discharged toward the elastic member through the hole provided in each end seat member.

Overall, in the present disclosure described above, it is possible in a damper device for attenuating rotational vibration by a viscous fluid to inhibit occurrence of viscous resistance greater than or equal to a planned magnitude of resistance and obtain desired damper attenuation performance.

BRIEF DESCRIPTION OF THE DRAWINGS

FIG. 4A is a front view of an end spring seat and FIG. 4B is a side view of the end spring seat.

FIG. 5A is a front view of an intermediate spring seat and FIG. 5B is a side view of the intermediate spring seat.

DETAILED DESCRIPTION

[Entire Configuration]

Figure 1:
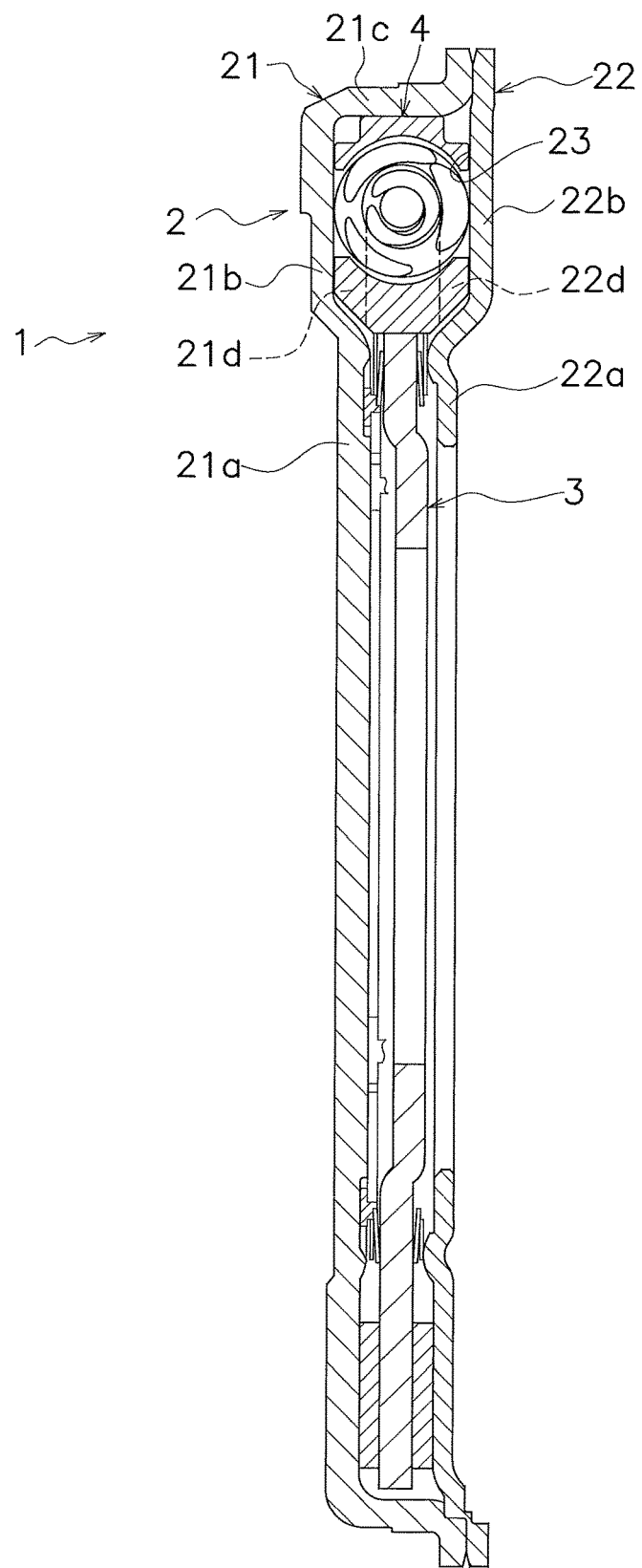
FIG. 1 is a cross-sectional view of a damper device according to an embodiment of the present disclosure.
Figure 2:
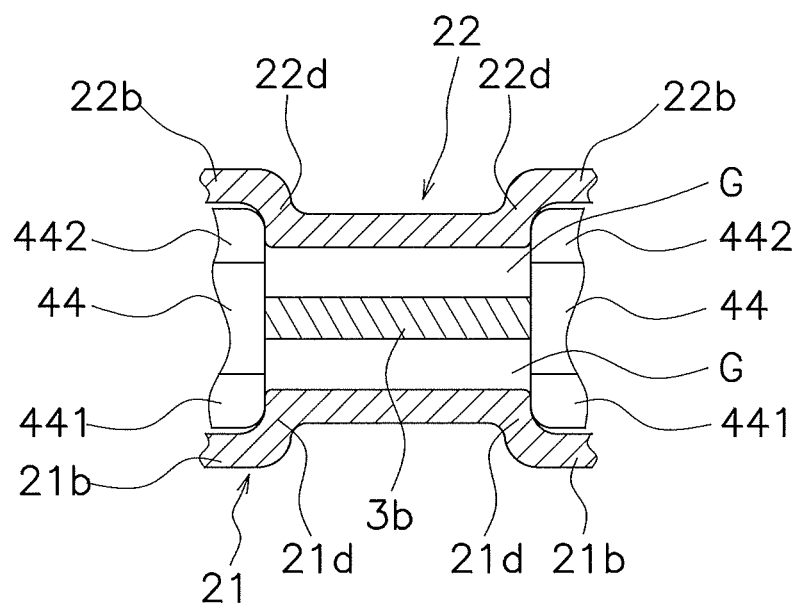
FIG. 2 is a cross-sectional plan view of part of the damper device.
Figure 3:
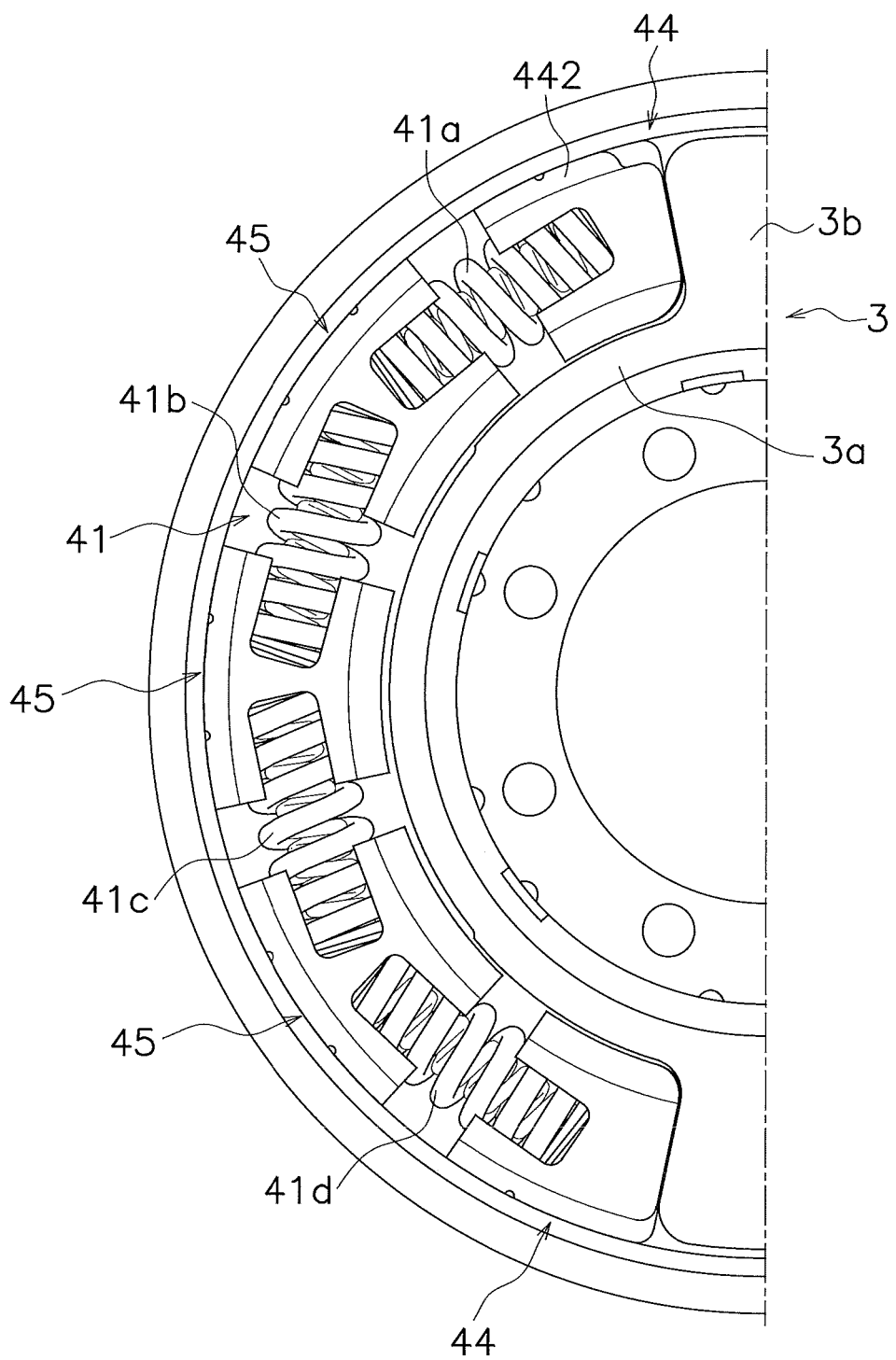
FIG. 3 is a front view of part of the damper device shown in FIG. 1.

FIG. 1 shows a cross-sectional configuration of a damper device 1, whereas FIG. 2 is a cross-sectional plan view of part of the damper device 1. Additionally, FIG. 3 is a front view of part of the damper device 1.

The damper device 1 is a device for transmitting power generated in an engine toward a transmission. The damper device 1 includes an input-side rotary member 2 (exemplary first rotary member), an output plate 3 (exemplary second rotary member) and a damper mechanism 4.

[Input-Side Rotary Member 2]

The input-side rotary member 2 is a member to which the power generated in the engine is inputted. The input-side rotary member 2 is supported by and coupled to an engine-side member (not shown in the drawings). The input-side rotary member 2 includes a first plate 21 and a second plate 22.

The first plate 21 includes a first plate body 21a having a disc shape, two first lateral portions 21b, and a tubular portion 21c extending in an axial direction from the outer peripheral part of the first plate body 21a and that of each first lateral portion 21b.

Outer peripheral portions 21d of the first plate body 21a are rotation-directional ends of the first lateral portions 21b, and function as first engaging portions. In other words, as shown in FIG. 2, the outer peripheral portions (first engaging portions) 21d of the first plate body 21a are capable of being rotation-directionally engaged with end spring seats 44 (to be described), respectively.

The first lateral portions 21b are portions bulging toward the engine than the first plate body 21a and are shaped by, for instance, stamping. The two first lateral portions 21b are disposed at equal pitches in a circumferential direction. Each first lateral portion 21b is provided in a range corresponding to four springs (to be described).

The second plate 22 is an annular member fixed to the tubular portion 21c, and includes a second plate body 22a having a disc shape, and two second lateral portions 22b.

Outer peripheral portions 22d of the second plate body 22a are rotation-directional ends of the second lateral portions 22b, and function as the first engaging portions similarly to the outer peripheral portions 21d of the first plate 21. In other words, as shown in FIG. 2, the outer peripheral portions (first engaging portions) 22d of the second plate body 22a are capable of being rotation-directionally engaged with the end spring seats 44 (to be described), respectively.

As described above, the first engaging portions 21d of the first plate body 21a and the first engaging portions 22d of the second plate body 22a are capable of being engaged with one circumferential-side ends of the end spring seats 44, respectively.

The second lateral portions 22b are portions bulging toward the transmission than the second plate body 22a and are shaped by, for instance, stamping. The two second lateral portions 22b are disposed at equal pitches in the circumferential direction. Each second lateral portion 22b is provided in the range corresponding to four springs.

As described above, the first plate 21 and the second plate 22 are disposed in opposition to each other at an interval in the axial direction, whereby an annular chamber 23 is formed between the both plates 21 and 22. A viscous fluid such as grease or so forth is filled in the annular chamber 23. Additionally, it is possible to form a relatively wide space for disposing the springs by disposing the second lateral portions 22b in the outer peripheral part of the input-side rotary member 2 so as to be opposed to the first lateral portions 21b.

[Output Plate 3]

The output plate 3 is disposed to be rotatable with respect to the input-side rotary member 2. The output plate 3 is supported by and coupled to a transmission-side member (not shown in the drawings).

As shown in FIG. 3, the output plate 3 is an annular member and includes a body 3a and two second engaging portions 3b protruding from the outer periphery of the body 3a to the further outer peripheral side. The two second engaging portions 3b are disposed in radially opposed positions.

The output plate 3 is disposed between the first and second plates 21 and 22 of the input-side rotary member 2 in the axial direction. In other words, the outer peripheral part of the output plate 3 is disposed in the interior of the annular chamber 23. The second engaging portions 3b are engaged with one circumferential-side ends of the springs (to be described). Therefore, the power transmitted to the input-side rotary member 2 is transmitted to the second engaging portions 3b, i.e., the output plate 3, through the plural springs.

[Damper Mechanism 4]

The damper mechanism 4 is a mechanism elastically coupling the input-side rotary member 2 and the output plate 3 in the rotational direction. The damper mechanism 4 includes two sets of torsion springs 41 (exemplary elastic member), four end spring seats 44 and six intermediate spring seats 45. Each set of torsion springs 41 is disposed between two triads of the engaging portions 21d, 22d and 3b.

Each set of torsion springs 41 is composed of first to fourth springs 41a, 41b, 41c and 41d disposed in alignment in the circumferential direction. These springs 41a to 41d act in series between the input-side rotary member 2 and the output plate 3.

The end spring seats 44 rotation-directionally make contact with the first engaging portions 21d and 22d of the input-side rotary member 2 in a neutral state that power is not being transmitted to the present device 1. Additionally, the end spring seats 44 are capable of making contact with the second engaging portions 3b of the output plate 3.

All the four end spring seats 44 have the same shape. As shown in FIGS. 3, 4A and 4B, each end spring seat 44 is made in the shape of a tube including openings in part of the both axial sides thereof. Each end spring seat 44 includes a tubular portion 44a and a bottom portion 44b. The tubular portion 44a is a portion into which an end portion of each first or fourth spring 41a, 41d is inserted. On the other hand, the bottom portion 44b is a portion with which the distal end of the end portion of each first or fourth spring 41a, 41d makes contact. Additionally, the bottom portion 44b is provided with a discharge hole 44e penetrating therethrough in the circumferential direction.

With the configuration described above, each end spring seat 44 supports the end portion of each first or fourth spring 41a, 41d in both radial and axial directions.

Each end spring seat 44 is provided with communicating grooves 441 and 442 on the both axial corners of the outer peripheral part thereof. Each communicating groove 441, 442 penetrates therethrough in the circumferential direction. Specifically, each end spring seat 44 is provided with the communicating grooves 441 and 442 on two corners at which an outer peripheral surface 44c and lateral surfaces 44d intersect. In other words, each communicating groove 441, 442 is opened to the outer peripheral side and one axial side. Additionally, each communicating groove 441, 442 penetrates each end spring seat 44 from one side to the other side in the rotational direction.

It should be noted that the cross-sectional shape of each communicating groove 441, 442 is not limited to a particular shape. The cross section of each communicating groove 441, 442 can be made in any of a variety of shapes such as a rectangle and a circular arc.

All the six intermediate spring seats 45 have the same shape. Each intermediate spring seat 45 is disposed between adjacent two of the springs 41. Specifically, the intermediate spring seats 45 are disposed between the first spring 41a and the second spring 41b, between the second spring 41b and the third spring 41c, and between the third spring 41c and the fourth spring 41d, respectively.

As shown in FIGS. 3, 5A and 5B, each intermediate spring seat 45 is made in the shape of a tube including openings in part of the both axial sides thereof. Each intermediate spring seat 45 includes two tubular portions 45a and bottom portions 45b provided in the two tubular portions 45a, respectively. End portions of the first to third springs 41a, 41b and 41c are inserted into one-side tubular portions 45a of the three intermediate spring seats 45. The distal ends of the end portions of the first to third springs 41a, 41b and 41c make contact with the bottom portions 45b of the one-side tubular portions 45a, respectively. End portions of the second to fourth springs 41b, 41c and 41d are inserted into the other-side tubular portions 45a of the three intermediate spring seats 45. The distal ends of the end portions of the second to fourth springs 41b, 41c and 41d make contact with the bottom portions 45b of the other-side tubular portions 45a, respectively.

With the configuration described above, the intermediate spring seats 45 support the end portions of the first to fourth springs 41a, 41b, 41c and 41d in both radial and axial directions.

Each intermediate spring seat 45 is provided with communicating grooves 451 and 452 on the both axial corners of the outer peripheral part thereof. Each communicating groove 451, 452 penetrates therethrough in the circumferential direction. Specifically, each intermediate spring seat 45 is provided with the communicating grooves 451 and 452 on two corners at which an outer peripheral surface 45c and lateral surfaces 45d intersect. In other words, each communicating groove 451, 452 is opened to the outer peripheral side and one axial side. Additionally, each communicating groove 451, 452 penetrates each intermediate spring seat 45 from one side to the other side in the rotational direction.

It should be noted that similarly to the configuration of each spring seat 44, the cross-sectional shape of each communicating groove 451, 452 is not limited to a particular shape. The cross section of each communicating groove 451, 452 can be made in any of a variety of shapes such as a rectangle and a circular arc.

Additionally, the communicating grooves 441 and 442 of each end spring seat 44 and the communicating grooves 451 and 452 of each intermediate spring seat 45 are provided in radially identical positions. In other words, the communicating grooves 441, 442, 451 and 452 are disposed on the circumference of a common circle.

[Seal Mechanism 50]

A seal mechanism 50 is provided between the output plate 3 (specifically, the body 3a) and both the first plate 21 and the second plate 22 so as to prevent the viscous fluid filled in the annular chamber 23 from flowing out therefrom.

Figure 6:
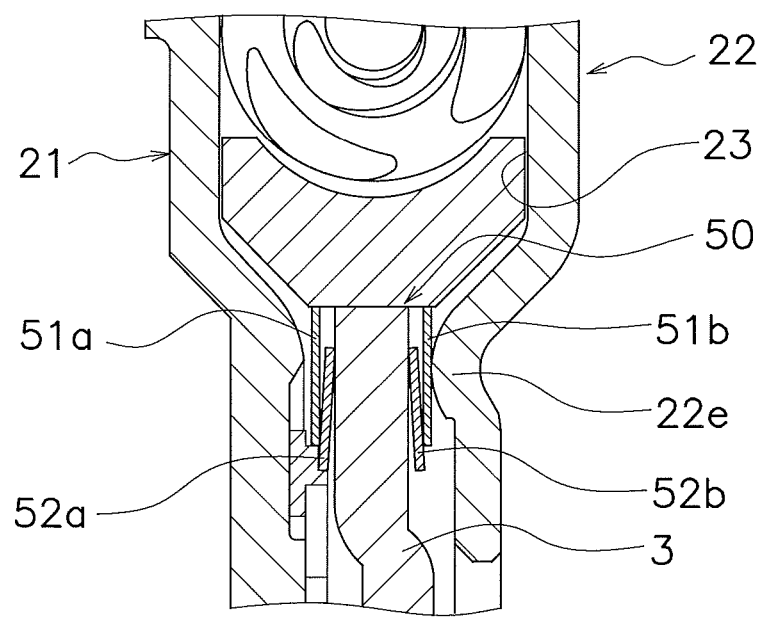
FIG. 6 is an enlarged view of part of FIG. 1.

As shown in FIG. 6, which is an enlarged view of part of FIG. 1, the seal mechanism 50 is provided in the inner peripheral part of the annular chamber 23, and includes seal members 51a and 51b, each of which has an annular shape, and cone springs 52a and 52b, each of which has an annular shape. Specifically, the seal member 51a and the cone spring 52a are disposed between a radially intermediate part of the first plate 2 and the output plate 3, while being sequentially aligned in this order from the first plate 21 side. Additionally, the second plate 22 is provided with an annular protruding portion 22e, protruding toward the first plate 21, on an inner peripheral part thereof. The seal member 51b and the cone spring 52b are disposed between the annular protruding portion 22e and the output plate 3, while being sequentially aligned in this order from the second plate 22 side.

With the configuration described above, each seal member 51a, 51b is pressed onto each cone spring 52a, 52b (and further onto the output plate 3) and each first/second plate 21, 22, whereby the inner peripheral part of the annular chamber 23 is sealed.

[Action]

In the neutral state that power is not being inputted to the input-side rotary member 2, the torsion springs 41 are not being compressed, and relative rotation (torsion) does not occur between the input-side rotary member 2 and the output plate 3.

When power is inputted to the input-side rotary member 2, the torsion springs 41 are compressed in accordance with the magnitude of power, and torsion occurs between the input-side rotary member 2 and the output plate 3. Additionally in this state, the power is transmitted from the input-side rotary member 2 to the output plate 3 through the torsion springs 41. Moreover, the torsion springs 41 are repeatedly compressed and extended in accordance with rotational vibration.

In damper actuation described above, the end spring seats 44 and the intermediate spring seats 45 slide inside the annular chamber 23, whereby slide resistance occurs. On the other hand, the viscous fluid flows from one side of each spring seat 44, 45 to the other side thereof, whereby viscous resistance occurs. A hysteresis torque occurs due to these resistances, whereby rotational vibration is inhibited.

Besides in damper actuation, as shown in FIG. 2, the viscous fluid flows into gaps G between the first and second plates 21 and 22 and the second engaging portions 3b of the output plate 3. Now, it is assumed that each end spring seat 44 is not provided with the communicating grooves 441 and 442. In this assumption, the viscous fluid, when flowing into the gaps G, is accumulated therein because each end spring seat 44 functions as a partition. Consequently, a hysteresis torque occurs due to unintended viscous resistance through the entire damper actuation range.

By contrast, in the present embodiment, each end spring seat 44 is provided with the communicating grooves 441 and 442. Hence, the viscous fluid, when flowing into the gaps G, smoothly flows out therefrom through the communicating grooves 441 and 442. Additionally, the viscous fluid in the gaps G flows out through the discharge hole 44e of each end spring seat 44 to the space in which the torsion spring 41 adjacent to each end spring seat 44 is disposed.

Especially, the viscous fluid residing inside the annular chamber 23 receives forces directed to the outer peripheral side. Therefore, the viscous fluid becomes likely to be evenly distributed in a circumferential shape through the communicating grooves 441 and 442 provided on the outer peripheral part of each end spring seat 44 and the communicating grooves 451 and 452 provided on the outer peripheral part of each intermediate spring seat 45. Because of this, it is possible to inhibit occurrence of a large hysteresis torque exceeding a hysteresis torque planned to occur due to the viscous fluid.

Other Embodiments

The present disclosure is not limited to the embodiment described above, and a variety of changes or modifications can be made without departing from the scope of the present disclosure.

(a) In the aforementioned embodiment, each end spring seat 44 and each intermediate spring seat 45 are both provided with the communicating grooves. However, it is only required that at least each end spring seat 44 is provided with the communicating grooves.

(b) The shape and position of each communicating groove are not limited to those in the aforementioned embodiment. For example, each spring seat can be provided with at least one groove, penetrating therethrough in the circumferential direction, on at least one lateral surface thereof.

(c) The number and shape of the end spring seats and those of the intermediate spring seats are not limited to those in the aforementioned embodiment.

(d) Each spring seat is provided with the communicating grooves on the both axial sides thereof. However, each spring seat is only required to be provided with the communicating groove on at least one axial side thereof.

(e) Each spring seat can be provided with at least one axially extending groove in addition to the communicating grooves penetrating therethrough in the circumferential direction. For example in FIG. 2, each end spring seat 44 can be provided with a groove connecting the groove 441 provided on one axial side and the groove 442 provided on the other axial side. In this case, the viscous fluid can be more evenly distributed in the axial direction.

(f) The aforementioned embodiment has explained the configuration that the input-side rotary member is supported by the engine-side member whereas the output plate is supported by the transmission-side member. However, the configuration of the respective rotary members is not limited to the above. For example, the present disclosure is similarly applicable as well to such a configuration that the input-side rotary member is rotatably supported by the output plate.

REFERENCE SIGNS LIST

2 Input-side rotary member (first rotary member)
21 First plate
22 Second plate
21d, 22d First engaging portion
23 Annular chamber
3 Output plate (second rotary member)
3b Second engaging portion
41 Torsion spring (elastic member)
44 End spring seat
44e Discharge hole
441, 442 Communicating groove
45 Intermediate spring seat
451, 452 Communicating groove

What is claimed is:

1. A damper device comprising:
   a first rotary member including a first engaging portion and an annular chamber filled with a viscous fluid in an interior thereof;
   a second rotary member including a second engaging portion, the second rotary member rotatable relative to the first rotary member;
   a plurality of elastic members aligned in a circumferential direction in the interior of the annular chamber, the plurality of elastic members configured to elastically couple the first rotary member and the second rotary member in a rotational direction; and
   a plurality of end seat members, each of the plurality of end seat members disposed between one of the plurality of elastic members and at least one of the first engaging portion and the second engaging portion, the each of the plurality of end seat members including an end seat communicating groove penetrating therethrough in the circumferential direction,
   the first engaging portion protruding in an axial direction such that an end of one of the plurality of end seat members in the circumferential direction is engaged with the first engaging portion,
   the end seat communicating groove being provided on both corners at which an outer peripheral surface and lateral surfaces intersect in the each of the plurality of end seat members, and
   the end seat communicating groove at least partly overlapping the first engaging portion as viewed along the circumferential direction.

2. The damper device according to claim 1, further comprising:
   at least one intermediate seat member disposed between the plurality of elastic members, the at least one intermediate seat member including an intermediate seat communicating groove penetrating therethrough in the circumferential direction.

3. The damper device according to claim 2, wherein
the end seat communicating groove and the intermediate seat communicating groove are disposed on a circumference of a common circle.
4. The damper device according to claim 1, wherein
the first rotary member includes a pair of disc-shaped members opposed to each other in the axial direction, and
the second rotary member is disposed between the pair of disc-shaped members in the axial direction.
5. The damper device according to claim 1, wherein
the each of the plurality of end seat members includes a hole penetrating through a bottom portion of the each of the plurality of end seat members in the circumferential direction, an end surface of the one of the plurality of elastic members contacting the bottom portion.

* * * * *